United States Patent Office 3,537,969
Patented Nov. 3, 1970

3,537,969
ELECTRODEPOSITION PROCESS
Robert D. Jerabek, Glenshaw, and Joseph E. Plasynski, Arnold, Pa., assignors to PPG Industries, Inc., Pittsburgh, Pa., a corporation of Pennsylvania
No Drawing. Filed Aug. 10, 1967, Ser. No. 659,616
Int. Cl. B01k 5/02; C23b 13/00
U.S. Cl. 204—181                                   12 Claims

ABSTRACT OF THE DISCLOSURE

An improved electrodeposition process is provided by use of a coating composition in which the resinous vehicle is a partially esterified and neutralized adduct of a drying oil fatty acid and an anhydride of an ethylenically unsaturated dicarboxylic acid, formed by reacting the adduct with a polyol in the presence of water and an amine. The preferred polyols are methylolated phenols and resinous polyols, reacted with maleic anhydride adducts of drying oils or fatty acid esters of resinous polyols. The electrodeposition process using such vehicles provides hard, adherent coatings of highly desirable properties and is characterized by high throwing power.

---

Application of coatings by electrodeposition has been known for some time, but recent development of several new types of materials which are uniquely adapted for application by this process has made such methods of increased commercial importance. While the materials presently available have been satisfactory for certain processes, they have been subject to several disadvantages, among the most troublesome being the necessity for controlling voltages to avoid rupturing the film and low throwing power. By "throwing power" is meant that property whereby different areas of the electrode to be coated receive substantially the same density of deposit even though at appreciably different distances from the other electrode.

It has been known that high throwing power is favored by the use of resins having relatively high molecular weight. However, the use of high molecular weight polymers which might otherwise be suitable for use in electrodeposition is difficult because of problems associated with the high viscosity of such materials. In order to reduce the viscosity of these high molecular weight resins, the use of elevated temperatures and dilution with suitable solvents have been attempted. However, because the reaction products contemplated for electrodepositable materials of higher molecular weight contain reactive functional groups, the use of elevated temperatures is relatively unsatisfactory because such higher temperatures favor cross-linking reactions. Such cross-linking, once started, is difficult or impossible to control, thereby resulting in even higher viscosities or gelation. This is particularly true with reaction products containing anhydride groups which at these higher temperatures are opened to provide highly reactive sites for cross-linking.

Similarly, extensive use of solvents in which the resins are soluble to reduce the viscosity during processing is not desirable because the presence of any substantial amount of such solvents, e.g., more than about 20 percent, has a detrimental effect upon throwing power, thereby defeating the initial reason for obtaining higher molecular weight.

In copending application Ser. No. 450,205, filed Apr. 22, 1965, there is disclosed a means for obtention of higher molecular weight products, which when applied by electrodeposition give increased throwing power and permits the use of higher voltages, as well as providing films of highly desirable properties. The reaction products disclosed in said copending application are obtained by partially esterifying the acidic component of a drying oil fatty acid ester-acid anhydride reaction product with a polyol, preferably a diol. The reaction is carried out at elevated temperatures and is followed by neutralization and addition of water to provide an electrodepositable composition.

However, the compositions as disclosed in the above copending application, while providing an improvement in the electrodeposition process there described, are still subject to several of the disadvantages mentioned above. Thus, unless the total functionality of the system is carefully controlled, the temperatures which are employed to form the reaction product open the anhydride rings and result in gelation of the product. This means that, from a practical standpoint, the compositions which can be employed are those which have a functionality of two or only slightly above two, thereby limiting the amount of cross-linking which can theoretically occur. At the same time, however, this limits the extent to which the molecular weight can be increased and thus the improvement in throwing power which can be provided.

It has now been found that an electrodeposition process having greatly improved throwing power and which provides coatings of highly desirable properties is provided by utilizing an aqueous composition containing as a major film-forming component a partially esterified neutralized vehicle formed by reacting an adduct of a drying oil fatty acid ester and an anhydride of an ethylenically unsaturated dicarboxylic acid, with a polyol, the reaction being carried out in the presence of water and an amine.

Carrying out the adduct-polyol reaction in this manner inherently controls the extent of reaction because the esterification reaction takes place concurrently with a hydrolysis reaction of the anhydride groups. Thus, a substantial increase in molecular weight is attained, while at the same time the possibility of gelation is essentially avoided. Furthermore, following this procedure permits the use of highly functional compositions which ultimately cure more completely upon baking, but which would normally gel unless the reaction is carried out in the manner described. Still another advantage is that the reaction can be carried out at room temperature or slightly above, but without the need for handling highly viscous compositions.

The "drying oil fatty acid esters" employed in the invention are esters of fatty acids which are or can be derived from drying oils or from such sources as tall oil, and which contain at least a portion of polyunsaturated fatty acids. In many cases, a drying oil per se is employed. Drying oils are those oils which have an iodine value of about 90 or above, as determined by method ASTM D1467–57T (thus including so-called "semidrying oils"). Examples of such esters include linseed oil, soya oil, safflower oil, perilla oil, tung oil, oiticia oil, poppyseed oil, sunflower oil, tall oil esters, walnut oil, dehydrated castor oil, herring oil, menhaden oil, sardine oil and the like.

Also including among such esters are esters modified with other acids, including saturated, unsaturated or aromatic acids, such as butyric acid, stearic acid, linoleic acid, phthalic acid, isophthalic acid, terephthalic acid, rosin, or benzoic acid, or an anhydride of such an acid. The acid-monified esters are made by transesterification of the ester, as by forming a di- or monoglyceride by alcoholysis, followed by esterification with the acid; they may also be obtained by partially reacting oil acids with a polyol and reacting the acid with the partial ester. Various polyols can be used, including glycerol, trimethylolethane, trimethylolpropane, pentaerythritol, sorbitol and the like. If desired, the esters can also be modified with monomers such as styrene or cyclopentadiene, or with resins containing residual unsaturation, such as polymerized or partially polymerized cyclopentadiene. Similarly, other esters of unsaturated fatty acids, for example, those prepared by the esterification of tall oil fatty acids with polyols, are also useful.

Also included among the drying oil fatty acid esters are alkyd resins prepared utilizing drying oils; esters of epoxides with such fatty acids, including ester of diglycidyl esters of polyhydric compounds as well as other mono-, di- and polyepoxides; drying oil fatty acid esters of polyols other than glycerol, such as butanediol, trimethylolethane, trimethylolpropane, trimethylolhexane, pentaerythritol and the like; and drying oil fatty acid esters of resinous polyols, such as homopolymers or copolymers of unsaturated aliphatic alcohols, e.g., allyl alcohol or metallyl alcohol, including copolymers of such alcohols with styrene or other ethylenically unsaturated monomers or with nonoil modified alkyd resins containing free hydroxyl groups. Esters of resinous polyols, and especially esters of copolymers of styrene and allyl alcohol, are particularly useful.

Any alpha, beta-ethylenically unsaturated dicarboxylic acid anhydride can be employed to produce the products described herein, provided the resultant product contains anhydride groups. These include such anhydrides as maleic anhydride, itaconic anhydride and other similar anhydrides. While the acidic reactant must be an anhydride, there may also be used ethylenically unsaturated dicarboxylic acids which form anhydrides, for example, maleic acid or itaconic acid, if the reaction conditions employed are sufficient to form the anhydride prior to or during the reaction with the fatty acid ester. The temperatures employed in the adduct-forming reaction are ordinarily sufficient to form the anhydride. Mixtures of any of the above acids or anhydrides may also be utilized. Generally speaking, the anhydride or acid employed contains from 4 to 12 carbon atoms, although longer chain compounds can be used if so desired.

While the exact nature of the reaction product of the anhydride with the fatty acid ester is not known with certainty, it is believed that the reaction takes place by addition of the unsaturated linkage of the anhydride to the carbon chain of the oil. In the case of the nonconjugated double bonds such as are present in linseed oil, the reaction may take place with the methylene group adjacent the nonconjugated double bond. In the place of oils having conjugated double bonds, such as tung oil, the reaction is probably of the Diels-Alder type.

The reaction between the acid or acid anhydride and the drying oil fatty acid ester takes place readily without the use of a catalyst and at temperatures in the range of about 100° C. to about 300° C. or higher, with the reaction generally being carried out between about 200° C. and about 250° C.

While the reaction products can be comprised solely of the fatty acid ester and the dicarboxylic acid anhydride, in many instances it is desirable to incorporate into the reaction product another ethylenically unsaturated monomer. For this purpose, any ethylenically unsaturated monomer, preferably containing a single $CH_2=C<$ group, can be employed. Examples of such monomers include monoolefinic and diolefinic hydrocarbons, such as styrene, vinyl toluene, butadiene-1,3, cyclopentadiene and the like; halogenated monoolefinic and diolefinic hydrocarbons, such as alpha-chlorostyrene, chlorobutadiene and similar compounds; esters of organic and inorganic acids, such as vinyl acetate, methyl methacrylate, butyl methacrylate, ethyl acrylate, butyl acrylate, isopropenyl acetate, allyl chloride, allyl cyanide, dibutyl itaconate, ethyl alpha-chloroacrylate, and diethyl maleate; organic nitriles, such as acrylonitrile, methacrylonitrile and ethacrylonitrile; and the like.

The ester-acid or anhydride adduct can also be modified with ethylenic resins, i.e., polymerized or partially polymerized materials containing residual ethylenic unsaturation. For example, the adduct can be modified with a hydrocarbon resin such as cyclopentadiene resin; these are made from cyclopentadiene, dicyclopentadiene, methylcyclopentadiene, etc. (often from a mixture of these) and may be added to the ester or adduct in monomeric or dimeric form, and further polymerized on contact therewith, or the polymer or partial polymer can be employed. Other ethylenic resins include partially polymerized mixed olefin petroleum fractions, and the like. The reaction of the fatty acid ester, the acid or anhydride, and any additional unsaturated modifying materials can be carried out concurrently, or the fatty acid ester can be reacted first with monomer and then with the acidic component; in most instances, however, the ester is preferably first reacted with the acid or acid anhydride, and then this product is subsequently reacted with any ethylentically unsaturated monomer or monomers at somewhat lower temperatures, e.g., between about 25° C. and 200° C.

The proportions of each of the components going to make up the reaction product can be varied. Generally speaking, between about 4 percent and about 40 percent by weight of the unsaturated acid anhydride is reacted with from about 60 percent to about 96 percent by weight of fatty acid ester. In the presently preferred products, usually 5 percent to 25 percent of anhydride and 75 percent to 95 percent of oil ester are employed.

If an additional ethylenic monomer (or ethylenic resin) is incorporated in the reaction product, it is typically used in amounts between about 5 percent and about 50 percent by weight based upon the weight of acid or anhydride and ester.

The adduct produced in the above manner is comprised of polymeric chains of moderate length and contains recurrent anhydride groups derived from the dicarboxylic acid or anhydride. The improved compositions of the present invention are obtained by reacting the recurrent anhydride groups with a polyol in the presence of water and an amine.

Essentially any polyol can be employed in the reaction with the adduct, including diols such as ethylene glycol and 1,4-butanediol, as well as higher polyols, such as trimethylolpropane, glycerol, pentaerythritol and the like. Glycol ethers may also be employed, such as diethylene glycol, triethylene glycol, and poly(oxytetramethylene)glycols. Because the specific manner in which the reaction is carried out permits highly functional polyols to be utilized without danger of gelation, the preferred polyols have more than 2 hydroxyl groups per molecule.

Methylolated phenolic compounds have been found to give especially good results, for example, trimethylol phenol or methylolated derivatives of phenol or phenol derivatives, such as those described in U.S. Pat. 2,579,330. Commercially available products of this type, such as those comprised of mixtures of mono-, di- and trimethylolated allyl ether of phenol, are particularly preferred, as is methylolated Bisphenol A, which ordinarily contains about 4 methylol groups per molecule.

Other polyols which are especially desirable are resinous polyols, such as homopolymers and copolymers of unsaturated alcohols, such as allyl alcohol, methallyl alcohol, allyl carbinol, vinyl ethyl carbinol, etc.; hydroxy-containing epoxy resins, such as reaction products of epichlorohydrin and Bisphenol A (e.g., Epon 834); high hydroxyl number polyester resins, such as glyceryl phthalate resins made with an excess of glycerol; polyether polyols, such as reaction products of ethylene and propylene oxides with sucrose; and the like. In choosing such resinous polyols, compatibility or mutual solubility with the particular adduct employed must be considered in order to provide a reasonable extent and rate of reaction. The preferred resinous polyols are copolymers of an unsaturated alcohol, such as allyl alcohol, with at least one vinyl monomer. Styrene is the comonomer in various commercially available resinous polyols of this class.

The proportion of polyol and ester-anhydride adduct that are employed depends upon various factors. The total functionality of the reactants is a guide to determining the optimum proportions to be employed, and contrary to previous products (e.g., those described in the above-mentioned copending application) in most instances should be greater than about 2 and preferably greater than about 2.5. By total functionality is meant the total number of anhydride and hydroxyl groups divided by the total number of molecules of polyol and adduct. The numbers involved are, of course, average figures. Many factors are taken into consideration in determining functionality, these being well known in the art; for example, with resinous products such as the adducts herein, not only the proportion of anhydride in the adduct but also the bodying effect due to heating and similar considerations should be taken into account.

In most instances, the reaction products herein are made from about 65 percent to about 98 percent of ester-anhydride adduct and about 2 percent to about 35 percent of polyol, these percentages being by weight. However, it will be understood that depending upon the molecular weights of the reactants, varying amounts within these ranges or outside these ranges are employed with particular reaction systems.

In many instances, only part of the anhydride groups of the adduct, e.g., about 10 percent, are reacted with the polyol. Of those anhydride groups reacted, it is preferred that only one of the carboxyl groups is esterified in each instance. This is relatively easily accomplished because the monoester of the dicarboxylic acid anhydride moieties present is preferentially obtained before the full ester begins to be formed, and because the water present reacts to open some of the anhydride groups and the carboxyl groups thus formed do not readily react with the polyol in the presence of water. Thus, while it is not necessary that each anhydride form the monoester and some of the dicarboxylic groups may be fully esterified, in actual practice the monoesters of the dicarboxylic acid moieties are usually obtained.

The reaction wiht the polyol is ordinarily carried out by admixing the initial reaction product of the fatty ester, the acid or anhydride, and any additional monomer with the polyol in the presence of water and amine. The reaction takes place at room temperature or slightly above, but if desired the reaction mixture can be heated moderately, i.e., to about 80° C. or higher.

As indicated above, the reaction of the anhydride-containing adduct and the polyol is carried out in the presence of water and an amine. There should be sufficient water present to react with a substantial proportion of the anhydride groups this being easily ascertained by monitoring the viscosity of the reaction mixture and adding water if the viscosity rises substantially. Except for this consideration the amount of water is not critical and an excess is ordinarily employed. Similar considerations apply to the amount of amine, which serves both as a catalyst for the anhydride-opening reaction and to neutralize the unesterified acid groups to provide water-solubility.

The extent of neutralization depends to some degree upon the proportion of acidic groups that have been reacted with the polyol; the higher the level of this esterification, the larger the proportion of the remaining acidity which should be neutralized. It is only necessary that the extent of neutralization be sufficient to provide a water-dispersible product. The neutralization reaction can be accomplished by adding all of the amine required during the adduct-polyol reaction, or by mixing additional neutralizing base with the partially esterified product. If this is done some amine should be present during mixing of the adduct and polyol to catalyze their reaction, the amount required being any small amount effective for this purpose.

The amine employed is preferably a tertiary amine, such as triethylamine, tripropylamine, triisopropylamine, tri-n-butylamine, and the like. Other amines, e.g., primary and secondary amines, can be employed but are less desirable. It is preferred that the amine be water soluble. In some cases, a mixture of amines including a tertiary amine and a non-tertiary amine is useful. In addition to those mentioned the amines which can be used in whole or in part include ammonia; alkyl amines, such as ethylamine, butylamine, amylamine, dimethylamine, dipropylamine, N-methylbutylamine, trimethylamine, triamylamine and trihexylamine; cycloalkyl amines, such as cyclohexylamine; unsaturated amines, such as allyl amine, N-methylallylamine and pyrrole; aryl-substituted amine, such as aniline, N-methylaniline, benzylamine, N-phenyldiethylamine, and m-toluidine; cyclic amines, such as morpholine and piperidine; diamines, such as ethylenediamine and piperazine; and substituted amines, such as histamine.

In the electrodeposition process, the foregoing aqueous products can be employed as such to electrodeposit clear films, but ordinarily they are used as a vehicle along with a pigment composition. The pigment composition used may be of any conventional type, comprising, for example, iron oxides, lead oxides, strontium chromate, carbon black, titanium dioxide, talc, barium sulfate and the like, as well as combinations of these and similar pigments. Color pigments, such as cadmium yellow, cadmium red, phthalocyanine blue, chromic yellow, toluidine red, hydrated iron oxide and the like, may be included if desired, as may be dispersing or surface-active agents, which should be of a nonionic or anionic type, or a combination of these types.

Usually the pigment and the surface-active agent, if any, are ground together in a portion of the vehicle to make a paste, and this is blended with the vehicle to produce the coating composition. There may also be included in the coating composition additives, such as antioxidants, wetting agents, driers, anti-foaming agents, bactericides, suspending agents, and the like. It is often desirable to include small amounts of water-miscible organic solvents, which may be added to the resinous vehicle prior to the reaction with the polyol to aid in handling and processing. 4-methoxy-4-methyl-pentanone-2 is a preferred solvent of this type, but others, such as dioxane and glycol diethers, can also be used.

It has been found that in most instances desirable coatings are obtained using pigmented compositions containing ratios of pigment-to-vehicle of not higher than about 1.5 to 1, and preferably not higher than about 1 to 1. If the composition has too high a pigment-to-vehicle ratio, the electrodeposited film may exhibit poor flow characteristics.

In formulating water-dispersed compositions, ordinary tap water may be employed. However, such water may contain a relatively high level of cations which, while not ordinarily rendering the process inoperative, may result in variations in the properties of the bath when used for electrodeposition. In such cases, it is often desirable to utilize deionized water from which free ions have been removed, as by passage through an ion exchange resin.

The compositions as described above are applied by placing the aqueous bath containing the composition in contact with an electrically conductive anode and an electrically conductive cathode, and passing an electric current between the electrodes. The electrodes may be of any electrically conductive material, usually metal, such as iron, steel, aluminum, galvanized steel, phosphatized steel, zinc, copper and other metals. Other electrically conductive materials or nonconductive materials (such as glass, plastics, etc.) having a surface made conductive by application of a conductive coating or layer, can also be coated in accordance with the invention. Upon the passage of electric current between the anode and the cathode, while in contact with the bath containing the coating composition, an adherent film of the coating composition is deposited upon the anode.

Generally speaking the conditions under which the electrodeposition process is carried out are those conventionally used in the electrodeposition methods employed heretofore. The applied voltage may be varied greatly, and can be very low, e.g., 1 volt, or very high, e.g., several thousand volts or even higher. A particular advantage of the products herein is that they permit the use of higher voltages without the problems usually encountered; thus they are often electrodeposited at from about 200 volts to about 500 volts.

It is desirable that the pH of the coating composition be as low as possible, consistent with product stability, and preferably under about 9. The problem of increased pH encountered in baths employed in continuous electrodeposition may be overcome by the addition of unneutralized or only slightly neutralized product to the baths, which lowers the pH without affecting the advantageous properties of the composition.

The concentration of the coating composition in the aqueous bath used in electrodeposition is not critical and relatively high levels of the coating composition can be used. However, it is ordinarily desirable to use as low a concentration of coating composition as will give satisfactory results; aqueous baths containing as little as about 1 percent by weight of the coating composition can be employed, and it is preferred not to use more than about 30 percent by weight of the coating composition in the bath.

Electrodeposition produces an adherent film which is very high in solids content, often 80 percent to 90 percent or even higher, which provides the important advantage that the film will not readily run or wash. Although the article so coated can be used, if desired, without additional baking or other drying procedures, additional baking or drying of the film is easily accomplished inasmuch as there is little or no solvent to be evaporated from the film. Ordinarily, the coated article is baked at temperatures of about 100° C. to 200° C. for about 10 minutes to 30 minutes.

The invention will be described further in conjunction with several examples showing the method and practice of the invention. These examples, however, are not to be construed as limiting the invention to their details. All parts and percentages are by weight and are based upon nonvolatile solids content unless otherwise indicated.

EXAMPLE 1

A reaction vessel was charged with 1165 parts of a resinous polyol made by the copolymerization of allyl alcohol and styrene and having a hydroxyl equivalent weight of about 207 (Shell Polyol X450). There were then added 36.5 parts of adipic acid, 1550 parts of tall oil fatty acids and 75 parts of xylene (as an azeotrope solvent). This mixture was slowly heated to 250° C. and held at this temperature while azeotropically removing the water evolved. After about 113 parts of water had been collected and the acid value had dropped to 14.0, the mixture was sparged with nitrogen to remove xylene and cooled to room temperature. There were then added 175 parts of maleic anhydride and the mixture heated to 225° C. for 2 hours, after which the reaction mixture was sparged for 15 minutes to remove unreacted maleic anhydride, cooled to 145° C., and 311 parts of 4-methoxy-4-methyl-pentanone-2 were added. The maleinized ester product had a nonvolatile solids content of 90 percent, a viscosity of 37,400 centipoises at 77° F. and an acid value of 40.6.

Three hundred parts of the maleinized ester thus produced was mixed with 2.7 parts of cresylic acid and a mixture of 37.5 parts of 4-methoxy-4-methyl-pentanone-2 and 17.5 parts of methylolated allyl ether of phenol, having an average of 3 methylol groups per molecule (commercially sold as Methylol 75108). To this mixture there were added 240 parts of deionized water and after mixing for 1 minute there were added 15.1 parts of triethylamine. After agitating for 5 minutes, this mixture was clear and viscous; 100 parts of deionized water were added and mixing was continued for 30 minutes. A coating composition was prepared by mixing this product with 185 parts of pigment paste employed was prepared by grinding the following in a steel ball mill for 16 hours:

| | Parts by weight |
|---|---|
| Maleinized linseed (80 percent linseed oil and 20 percent maleic anhydride) | 317.5 |
| Cresylic acid | 4.5 |
| Deionized water | 1182.5 |
| Diethylamine | 54.5 |
| Dispersing agent [1] | 15.0 |
| Basic lead silicate | 150 |
| Strontium chromate | 75 |
| Red iron oxide | 1275 |

[1] Combination oil-soluble sulfonate and nonionic surfactant known as Witco 912.

The coating composition thus prepared was reduced to 10 percent nonvolatile solids content with deionized water and electrodeposited using zinc phosphated steel electrodes. Coating was carried out at 430 volts for 2 minutes at 77° F. and there was obtained an adherent coating of about 0.7 mil thickness which after baking for 45 minutes at 325° F. had good properties, including good salt spray resistance and saponification resistance. The throwing power of the composition was measured by electrodepositing as above using as the anode a ½ inch wide steel strip suspended inside a ⅝ inch inside diameter steel pipe, the anode being immersed in the bath to a depth of 10½ inches. The height of the electrodeposited film on the inner steel strip is a measure of throwing power, and in this instance the strip was coated to a height of 8½ inches. After stirring the aqueous composition for 15 days, the throwing power was again measured using 500 volts for 2 minutes and was found to be 10½ inches.

By comparison, the throwing power of a corresponding maleinized ester-based coating composition, made in the same manner but omitting the methylolated allyl ether of phenol, could only be coated at 300 volts without rupturing the film and gave a throwing power of only 7 inches when tested in the above manner.

Illustrating the criticality of the manner in which the reaction product of the maleinized ester and the polyol is carried out was a test carried out similarly to Example 1, except that the maleinized ester, the methylolated allyl ether of phenol, and the triethylamine, cresylic acid, and 4-methoxy-4-methyl-pentanone-2 were combined without any water present. The mixture gelled rapidly upon mixing.

EXAMPLE 2

Example 1 was repeated, except that the methylolated allyl ether of phenol was replaced by an equal weight of methylolated Bisphenol A having an average of 4 methylol groups per molecule and the amount of triethylamine was increased to 16.7 parts. Electrodeposition was carried out in the manner described in Example 1; coatings of excellent properties were again obtained, and the composition had a throwing power (as measured above) of 10½ inches after coating for 2 minutes at 500 volts.

EXAMPLE 3

A mixture of 52.4 parts of a 50 percent solution of the resinous polyol employed in Example 1 in 4-methoxy-4-methyl-pentanone-2, 30 parts of additional 4-methoxy-4-methyl-pentanone-2, and 4.05 parts of cresylic acid, was mixed with 450 parts of maleinized ester prepared as in Example 1. After mixing for 5 minutes, 360 parts of deionized water and 25 parts of triethylamine were added. This mixture was agitated for 25 minutes and 150 parts of deionized water were added and mixing continued for 45 minutes. There were then added 277.5 parts of the pigment paste described in Example 1, and after mixing for 25 minutes, 347 additional parts of deionized water were added. This composition was stirred for 4 days and then reduced to 17 percent nonvolatile solids content with deionized water and electrodeposited as in Example 1. At 460 volts for 2 minutes, an 0.75 mil film was obtained having excellent properties. In measuring the throwing power as in Example 1, the composition gave 10½ inches of coverage at 460 volts for 2 minutes.

EXAMPLE 4

Following a procedure similar to that of Example 1, a maleinized epoxy ester was prepared from the following:

| | Parts by weight |
|---|---|
| Polyepoxide [1] | 1008 |
| Segregated cottonseed fatty acids (iodine value about 140) | 1775 |
| Zinc naphthanate solution (10 percent zinc) | 10 |
| Xylene (azeotrope solvent) | 70 |
| Maleic anhydride | 242 |
| 4-methoxy-4-methyl-pentanone-2 | 525 |

[1] Bisphenol A-epichlorohydrin polyether condensate having an epoxide equivalent of 950 and an esterification equivalent of 175 (Epon 1004).

The maleinized ester obtained had an acid value of 48.1 (titrated with alcoholic KOH), a viscosity of 32,500 centipoises at 77° F., and a nonvolatile solids content of 84.5 percent.

Two hundred and forty parts of the above maleinized ester were mixed with 2.1 parts of cresylic acid, 29 parts of allyl ether of phenol (as in Example 1), and 21.5 parts of 4-methoxy - 4 - methyl-pentanone-2. To this mixture there were added 150 parts of deionized water, followed by 14.2 parts of triethylamine. After mixing for 3 minutes, the mixture was clear and viscous and another 150 parts of deionized water were added, and after mixing for 10 more minutes, 154 parts of the pigment paste described in Example 1 were added. Mixing was continued for 10 minutes and then 170 parts of deionized water were added to give a clear solution. (It may be noted that in similar tests in which the initial water addition is omitted prior to incorporating the triethylamine the mixture immediately gelled.)

The aqueous composition thus prepared was reduced to 10 percent nonvolatile solids content with deionized water and electrodeposited, as in Example 1, at 330 volts for 2 minutes. A film about 0.8 mil thick was obtained which, after baking for 45 minutes at 325° F., had excellent properties. For example, its corrosion resistance, as illustrated by a test in which a scribed panel was exposed to salt fog at 100° F. for 250 hours, was outstanding. The throwing power of the composition in the electrodeposition process as measured in the manner of Example 1 was 9 inches at 500 volts for 2 minutes. In contrast, a corresponding primer made without the polyol could only be electrodeposited at 340 volts and had a throwing power of 7½ inches.

EXAMPLE 5

Maleinized linseed oil was prepared by reacting 168 parts of linseed oil and 41.3 parts of maleic anhydride at 500 to 510° F. to give a product having a Gardner-Holdt viscosity of T–U as a 75 percent solution in xylene. A mixture of 198.5 parts of the maleinized linseed oil, 1.98 parts of cresylic acid and 28.9 parts of the methylolated allyl ether of phenol (as in Example 1) was mixed until uniform and then 300 parts of deionized water and 26.7 parts of triethylamine were added. After mixing for 5 minutes 50 parts of deionized water were added and mixing continued for 10 more minutes. There were then incorporated 257 parts of the pigment paste described in Example 1, followed by 80 parts of deionized water.

This composition, after being reduced to 10 percent nonvolatile solids content with deionized water, was electrodeposited in the manner described in Example 1 at 340 volts for 2 minutes. Excellent properties were again obtained, similar to those described in Example 4.

EXAMPLE 6

Example 5 was repeated except that the composition employed was made using an equal quantity of diethylamine in place of the triethylamine. This composition, after aging for three days and reduction to 10 percent nonvolatile solids content, had a throwing power of 8½ inches when electrodeposited for 2 minutes at 360 volts. The coating obtained again had good properties.

According to the provisions of the patent statutes, there are described above the invention and what are now considered to be its best embodiments. However, within the scope of the appended claims, it is to be understood that the invention can be practiced otherwise than as specifically described.

We claim:

1. An electrodeposition process for coating a conductive substrate, which comprises passing an electric current between an electrically conductive cathode and an electrically conductive anode in contact with an aqueous composition containing as a major film-forming component a partially esterified and neutralized product formed by reacting:
   (a) an adduct of a drying oil fatty acid ester and at least one anhydride of an alpha-beta-ethylenically unsaturated dicarboxylic acid, said adduct containing pendent anhydride groups derived from said anhydride, and
   (b) a polyol,
said reaction being carried out in the presence of water and an amine.

2. The process of claim 1 in which the polyol is a methylolated phenolic compound.

3. The process of claim 2 in which the methylolated phenol is methylolated allyl ether of phenol.

4. The process of claim 2 in which said methylolated phenol is methylolated Bisphenol A.

5. The process of claim 1 in which said polyol is a resinous polyol.

6. The process of claim 5 in which said resinous polyol is a copolymer of styrene and allyl alcohol.

7. The process of claim 1 in which said adduct is made from about 60 percent to about 96 percent by weight of said drying oil fatty acid ester and from about 4 percent to about 40 percent by weight of said anhydride based upon the total weight of the said fatty acid ester and said anhydride.

8. The process of claim 1 in which said anhydride is maleic anhydride.

9. The process of claim 1 in which said fatty acid ester is a drying oil.

10. The process of claim 1 in which said fatty acid ester is an ester of a fatty acid and a resinous polyol.

11. The process of claim 10 in which said resinous polyol is a copolymer of styrene and allyl alcohol.

12. The process of claim 1 in which said amine is a tertiary amine.

References Cited

UNITED STATES PATENTS 3,441,489  4/1969  Gacesa _____ 204—181

HOWARD S. WILLIAMS, Primary Examiner